J. RESTEIN.
PACKING.
APPLICATION FILED JAN. 17, 1911.
1,020,661.
Patented Mar. 19, 1912.
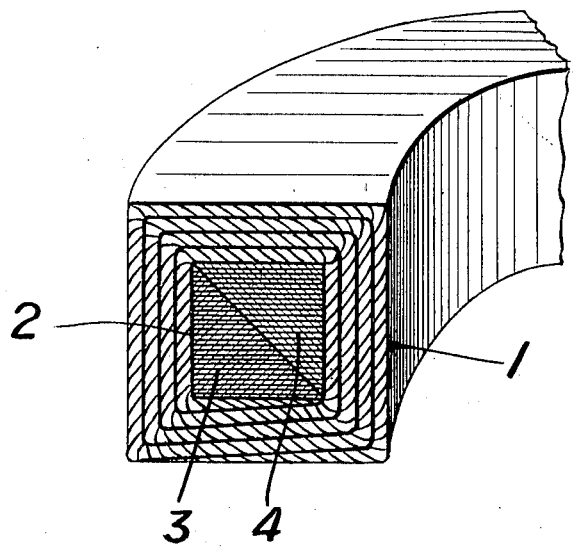
WITNESSES:
INVENTOR
Jules Restein
BY
Augustus B. Stoughton.
ATTORNEY.

UNITED STATES PATENT OFFICE.

JULES RESTEIN, OF PHILADELPHIA, PENNSYLVANIA, ASSIGNOR TO CLEMENT RESTEIN, OF PHILADELPHIA, PENNSYLVANIA.

PACKING.

1,020,661.  Specification of Letters Patent.  Patented Mar. 19, 1912.

Application filed January 17, 1911. Serial No. 603,101.

*To all whom it may concern:*

Be it known that I, JULES RESTEIN, a citizen of the United States, residing at the city of Philadelphia, in the county of Philadelphia and State of Pennsylvania, have invented a certain new and useful Packing, of which the following is a specification.

The principal object of the present invention is to provide a packing which shall operate satisfactorily and in the same way no matter in what position it is inserted or placed in the box or gland, which shall, when wet or moistened, swell or expand evenly in all directions whereby excessive friction on the rod is at all times avoided, which can be adjusted so as to shift its parts and thus prolong the period of its usefulness, and which retains the lubricating graphite or the like in such a way that it can not be washed out.

A packing embodying the invention will be claimed at the end hereof but will first be described in connection with the accompanying drawing in which it is illustrated principally in section.

In the drawing 1, is a hollow strip of packing having through it a lengthwise ranging opening 2, which is square in cross-section. This hollow strip of packing may consist of layers of duck and rubber and can be made by winding the duck with the proper application of rubber around a square rod or mandrel. This hollow strip is and operates as a real packing and it also serves a purpose which will be presently described.

3 and 4, are wedge-like strips or wedges arranged within the hollow strip of packing 1. In cross-section these strips are of the form obtained by cutting a square along one of its diagonals. The two wedges taken together are therefore square in cross-section and occupy the square opening through the strip 1. The wedges may consist of layers of duck and rubber and they are lubricated as with graphite. The hollow strip 1, retains the graphite or lubricant along with the wedges within its interior so that the graphite or lubricant may not be washed out.

When the packing is placed in a gland or stuffing box it makes no difference which side of it is placed toward the rod because operatively the packing is symmetrical. This is a matter of practical importance as the packing will operate equally well no matter which way it is placed in the gland or stuffing box. When the packing is wet since it is symmetrical, the strip 1, will tend to expand evenly in all directions, that is, on the drawing evenly in vertical and horizontal directions. This is a matter of importance because it does not bring undue pressure to bear on the rod which would of course give rise to an undesirable amount of friction, for example, if the rod is assumed to range vertically on the drawing and to be in contact with the righthand face of the packing, then only the horizontal expansion pressure reaches the rod and the vertical expansion pressure is taken up in the box or gland. Since the packing is symmetrical the pressure, due to expansion on the rod, is one-half of the total pressure due to expansion and is not excessive. The face of the hollow strip 1, packs the rod and will of course wear for a comparatively great length of time. However, when it is worn the application of gland pressure operating on the wedges shifts them in relation to each other and thus again properly packs the rod. The fact that the graphite or lubricant is retained in the hollow strip 1, obviously facilitates such movement of the wedges as has been described.

What I claim is:

A packing comprising the combination of a hollow strip of packing material square in cross-section and having through it a lengthwise ranging opening of square cross-section, a pair of complemental wedge strips arranged in the opening, and a lubricator applied to the wedge strips and retained by the hollow strip.

In testimony whereof I have hereunto signed my name.

JULES RESTEIN.

Witnesses:
CLIFFORD K. CASSEL,
K. M. GILLIGAN.

Copies of this patent may be obtained for five cents each, by addressing the "Commissioner of Patents, Washington, D. C."